(12) United States Patent
Kikuyama

(10) Patent No.: US 8,111,411 B2
(45) Date of Patent: Feb. 7, 2012

(54) INFORMATION PROCESSING APPARATUS, METHOD, AND COMPUTER PROGRAM

(75) Inventor: Tatsuya Kikuyama, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1008 days.

(21) Appl. No.: 11/600,022

(22) Filed: Nov. 16, 2006

(65) Prior Publication Data

US 2007/0115492 A1 May 24, 2007

(30) Foreign Application Priority Data

Nov. 18, 2005 (JP) .................................. 2005-334813

(51) Int. Cl.
*G06F 3/12* (2006.01)

(52) U.S. Cl. .......................... 358/1.13; 358/1.9; 709/246

(58) Field of Classification Search ................. 358/1.13, 358/1.15; 709/201, 220, 246
See application file for complete search history.

(56) References Cited

U.S. PATENT DOCUMENTS

| | | | | |
|---|---|---|---|---|
| 7,207,735 | B2 * | 4/2007 | Narusawa et al. | 400/76 |
| 2002/0073118 | A1 * | 6/2002 | Costigan et al. | 707/513 |
| 2004/0093333 | A1 | 5/2004 | Suzuki et al. | |
| 2004/0109190 | A1 * | 6/2004 | Nagai | 358/1.13 |
| 2005/0108649 | A1 * | 5/2005 | Ueda | 715/760 |
| 2005/0211759 | A1 | 9/2005 | Breslin et al. | |
| 2005/0262483 | A1 * | 11/2005 | Laird | 717/120 |
| 2005/0275852 | A1 * | 12/2005 | Ferlitsch | 358/1.6 |
| 2005/0289520 | A1 * | 12/2005 | Overall | 717/137 |
| 2007/0115492 | A1 * | 5/2007 | Kikuyama | 358/1.13 |
| 2008/0028101 | A1 * | 1/2008 | Dewa | 709/246 |

FOREIGN PATENT DOCUMENTS

| | | |
|---|---|---|
| EP | 1628227 A1 | 2/2006 |
| JP | 5334055 A | 12/1993 |
| JP | 9022345 A | 1/1997 |
| JP | 2000225754 A | 8/2000 |
| JP | 2003108331 A | 4/2003 |
| JP | 2004164104 A | 6/2004 |
| JP | 2004348480 A | 12/2004 |
| JP | 2005512205 A | 4/2005 |
| JP | 2005-122377 | 5/2005 |
| WO | 03049056 A2 | 6/2003 |

OTHER PUBLICATIONS

English Machine Translation of JP 2004/348480, Mikihiro et al, Pub. in Dec. 9, 2004.*
English Machine Translation of JP 09/022345, Toshitaka et al, Pub. in Jan. 21, 1997.*
English Machine Translation of JP 2004/348480, Mikihiro et al, Pub in Dec. 9, 2004.*
English Machine Translation of JP09/022345, Toshitaka et al, Pub in Jan. 21, 1997.*
Japanese Office Action dated Feb. 17, 2009 in corresponding Japanese Application No. 2005-334813.

* cited by examiner

*Primary Examiner* — Benny Tieu
*Assistant Examiner* — Marcellus Augustin
(74) *Attorney, Agent, or Firm* — Fitzpatrick, Cella, Harper & Scinto

(57) ABSTRACT

This invention allows to print without installing a driver program for every printer and easily coping with a change in printer control command specifications. To accomplish this, an information processing apparatus for generating a printer command to control a printer generates a command by using a command configuration XML file representing a printer command configuration in which a part that changes due to an external factor such as a user interface is described by a reserved word, thereby coping with a printer model and user environment.

6 Claims, 10 Drawing Sheets

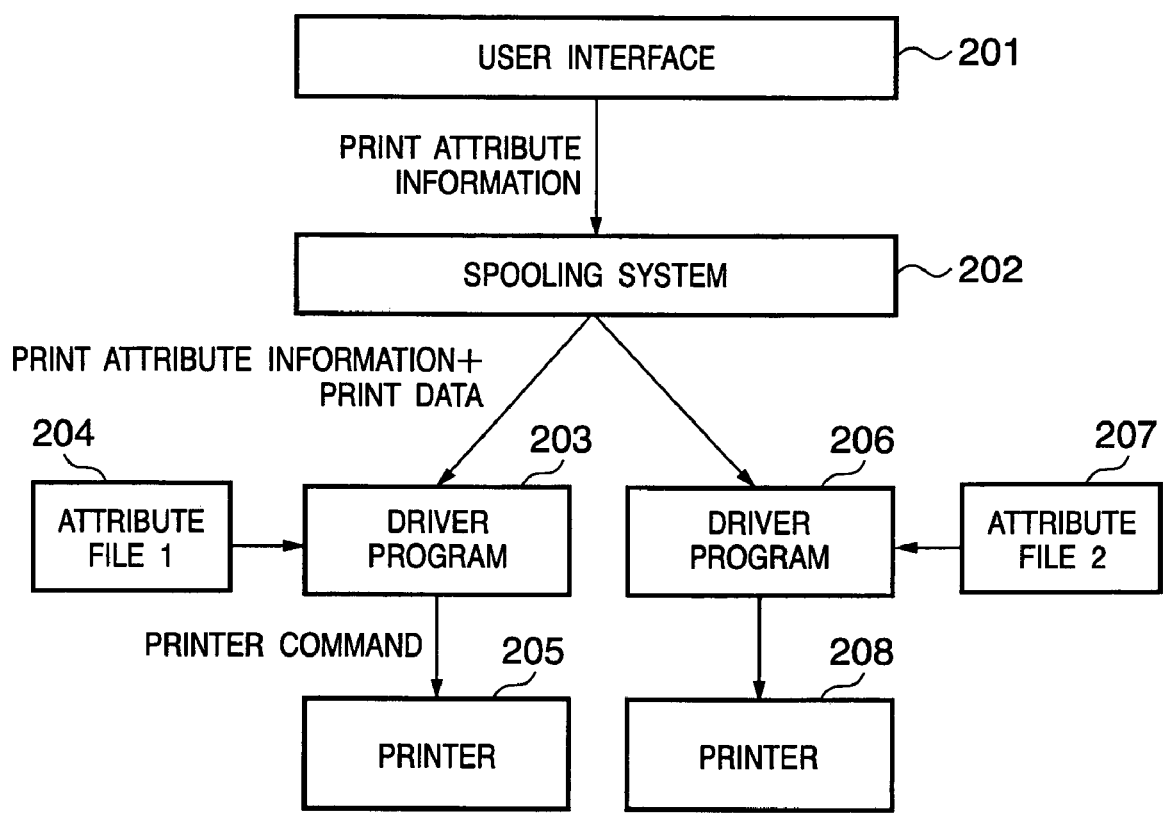

FIG. 3

```xml
<?xml version="1.0" encoding="UTF-8"?>
<!DOCTYPE "PrinterCommand.Dtd">
<PrinterCommand>
    <JobHeader1>
        <Attribute AttributeName="Mode">          ⎫
          <attr_id>128</atr_id>                    ⎬ 301
          <attr_value>23</attr_value>              ⎪
        </Attribute>                               ⎭
        <Attribute AttributeName="Schedule">
          <attr_id>119</atr_id>
          <attr_value>11</attr_value>
        </Attribute>
            .
            .
    </JobHeader1>
    <DocHeader>
        <Attribute AttributeName="InputSlot">  ~ 302
            <attr_id>100</atr_id>
            <attr_value>*******</attr_value>  ~ 303
            <default_value def_id="1">10</default_value> ~ 304
            <attr_table nAttrNum="4">                        ⎫
              <attr_reference key="Cas1">10</attr_reference>  ⎪
              <attr_reference key="Cas2">11</attr_reference>  ⎬ 305
              <attr_reference key="Cas3">100</attr_reference> ⎪
              <attr_reference key="Cas4">101</attr_reference> ⎪
            </attr_table>                                    ⎭
        </Attribute>
    </DocHeader>

</PrinterCommand>
```

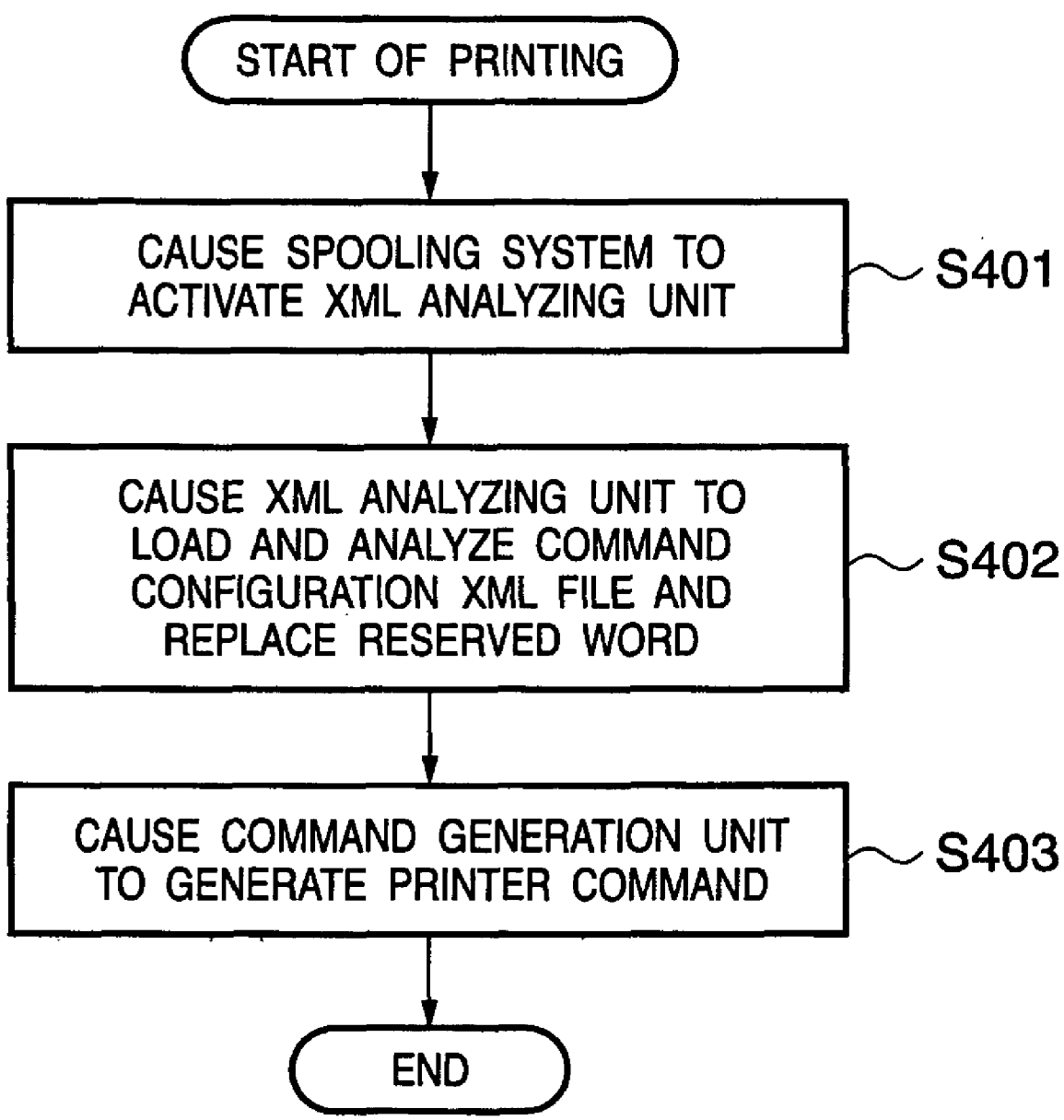

FIG. 9

COMMAND CONFIGURATION XML FILE

<Attribute AttributeName="InputSlot">
  <attr_id>100</atr_id>
  <attr_value>*******</attr_value> ~901
  <default_value def_id="1">10</default_value>
  <attr_table nAttrNum="4">
    <attr_reference key="Cas1">10</attr_reference>
    <attr_reference key="Cas2">11</attr_reference>

ATTRIBUTE INFORMATION FROM USER INTERFACE

InputSlot=Cas2 ~911
OutputBin=Bin1
⋮

<Attribute AttributeName="InputSlot"> ~921
  <attr_id>100</atr_id>
  <attr_value>11</attr_value> ~922
</Attribute>

INFORMATION PROCESSING APPARATUS, METHOD, AND COMPUTER PROGRAM

BACKGROUND OF THE INVENTION

1. Field of the Invention

The present invention relates to an information processing apparatus and method which generates a command to control a printer.

2. Description of the Related Art

In print processing, normally a user interface provides instructions to start printing, and a spooling system receives a print request and activates a driver program to generate a print command.

This will be described with reference to FIG. 2. A user interface 201 executes various kinds of settings related to printing and gives instructions to start printing. A spooling system 202 receives this data as a print request.

The spooling system 202 activates a driver program 203 to convert the print data received as the print request into a printer command to control a printer 205. The driver program 203 reads out printer component information and PDL information from an attribute file 204 representing the features of the printer 205 and converts the readout information into a printer command suitable for the printer 205.

The driver program 203 sends the generated printer command to the printer 205 to do print processing.

To cause a printer 208 to print, normally the spooling system 202 activates a driver program 206, which is different from the driver program 203. The drive program 206 reads out various kinds of information from an attribute file 207 representing the features of the printer 208, generates a printer command suitable for the printer 208, and sends the command to the printer 208.

However, printer commands interpretable by printers change depending on the printer model. Each printer must have its own driver program. To use another printer, the user must install a new driver program.

A scheme to make different printers share a driver program is also used In this scheme, a device-dependent characteristic is described in an attribute file, and the driver program reads out the device-dependent information from the attribute file. However, if the configuration specifications of a printer command to be interpreted by a printer change, the driver program needs to be corrected. That is, a new driver program must be provided.

SUMMARY OF THE INVENTION

The present invention provides an information processing apparatus capable of allowing printing without installing a driver program for each printer and easily coping with a change in printer command specifications.

According to the present invention., the foregoing object is attained by providing an information processing apparatus for generating a command to control a printer, comprising:

a unit adapted to prepare a command configuration XML file representing a command configuration;

an analyzing unit adapted to analyze the command configuration XML file; and a command generation unit adapted to generate a printer control command on the basis of the command configuration XML file.

According to another aspect of the present invention, the foregoing object is attained by providing an information processing method of generating a command to control a printer, comprising the steps of:

analyzing a command configuration XML file representing a command configuration to be generated in command generation; and generating a printer control command on the basis of the command configuration XML file.

Further features of the present invention will become apparent from the following description of exemplary embodiments with reference to the attached drawings.

BRIEF DESCRIPTION OF THE DRAWINGS

FIG. 2 is a block diagram showing an arrangement example of a conventional print system;

FIG. 3 is a view showing an example of a command configuration XML file;

FIG. 4 is a flowchart showing processing applying the present invention;

FIG. 9 is a view showing an example wherein a printer command XML file is generated from the XML file example in FIG. 3 and the attribute value of the user interface.

DESCRIPTION OF THE EMBODIMENTS

Preferred embodiments of the present invention will now be described in detail in accordance with the accompanying drawings. It should be noted that the relative arrangement of the components, the numerical expressions and numerical values set forth in these embodiments do not limit the scope of the present invention unless it is specifically stated otherwise.

First Embodiment

Figure 1:
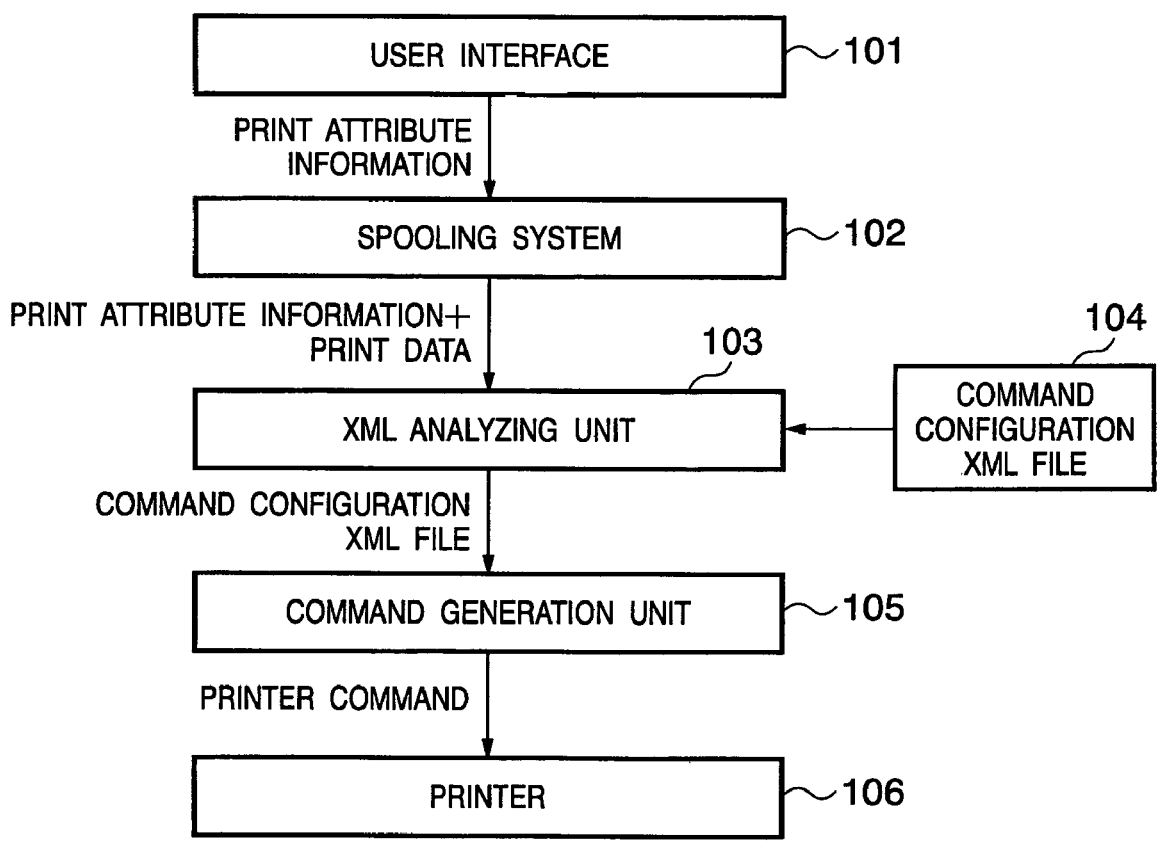
FIG. 1 is a block diagram showing the functional arrangement of a system including an information processing apparatus according to an embodiment.

This embodiment is related to an information processing apparatus for generating a printer command to control a printer in print processing. FIG. 1 is a view showing the features of the present invention best. A user interface 101 sets a print attribute. Reference numeral 102 denotes a spooling system. An XML analyzing unit 103 analyzes a command configuration XML file and fills an unset part of a command configuration XML file 104 on the basis of the command configuration XML file and external factor information such as print attribute information from the user interface 101. The command configuration XML file 104 describes a command specification configuration to be received by a printer. A part to be changed by an external factor is marked as a reserved word containing a specific character string. A command generation unit 105 generates a printer command for a printer 106.

Figure 10:
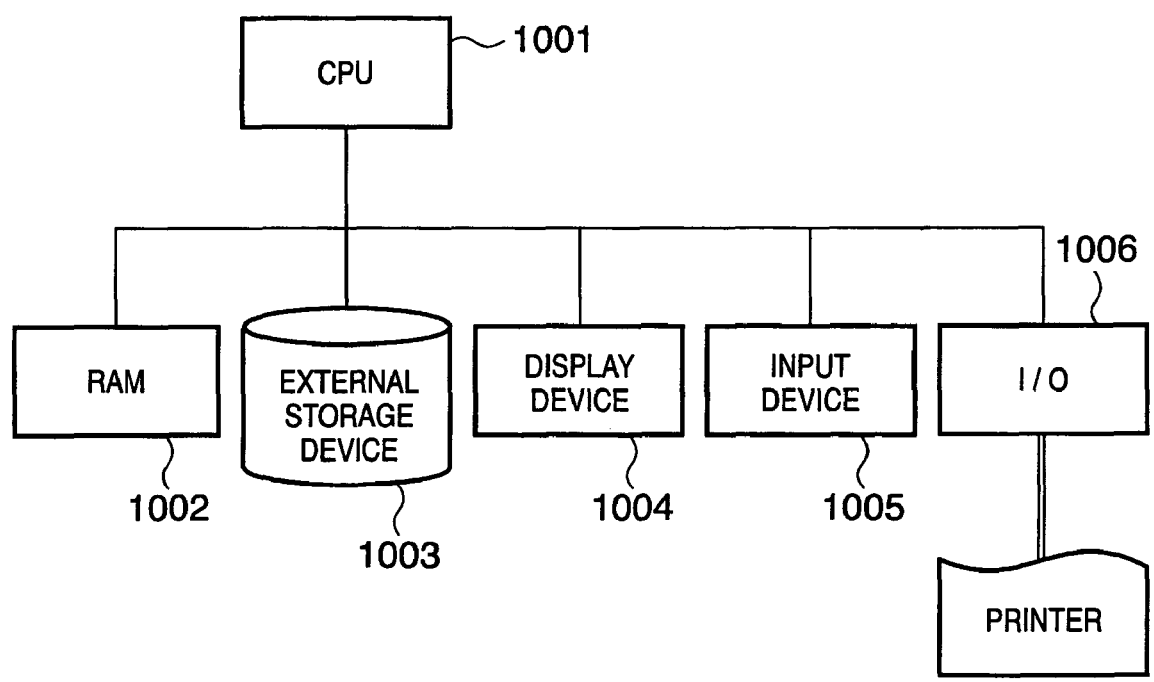
FIG. 10 is a block diagram showing the system arrangement of a computer according to the embodiment.

FIG. 10 is a block diagram showing the system arrangement of a computer according to this embodiment. A CPU (Central Processing Unit) 1001 executes control according to the present invention. A RAM 1002 is a storage device that loads and runs a program of the present invention and also temporarily stores data. An external storage device 1003 including a hard disk stores the program of the present invention. A display device 1004 including a CRT or LCD displays, e.g., the user interface 101. An input device 1005 including a keyboard and a mouse is used for various kinds of inputs and instructions. An I/O 1006 is a physical interface connected to a printer.

Figure 5:
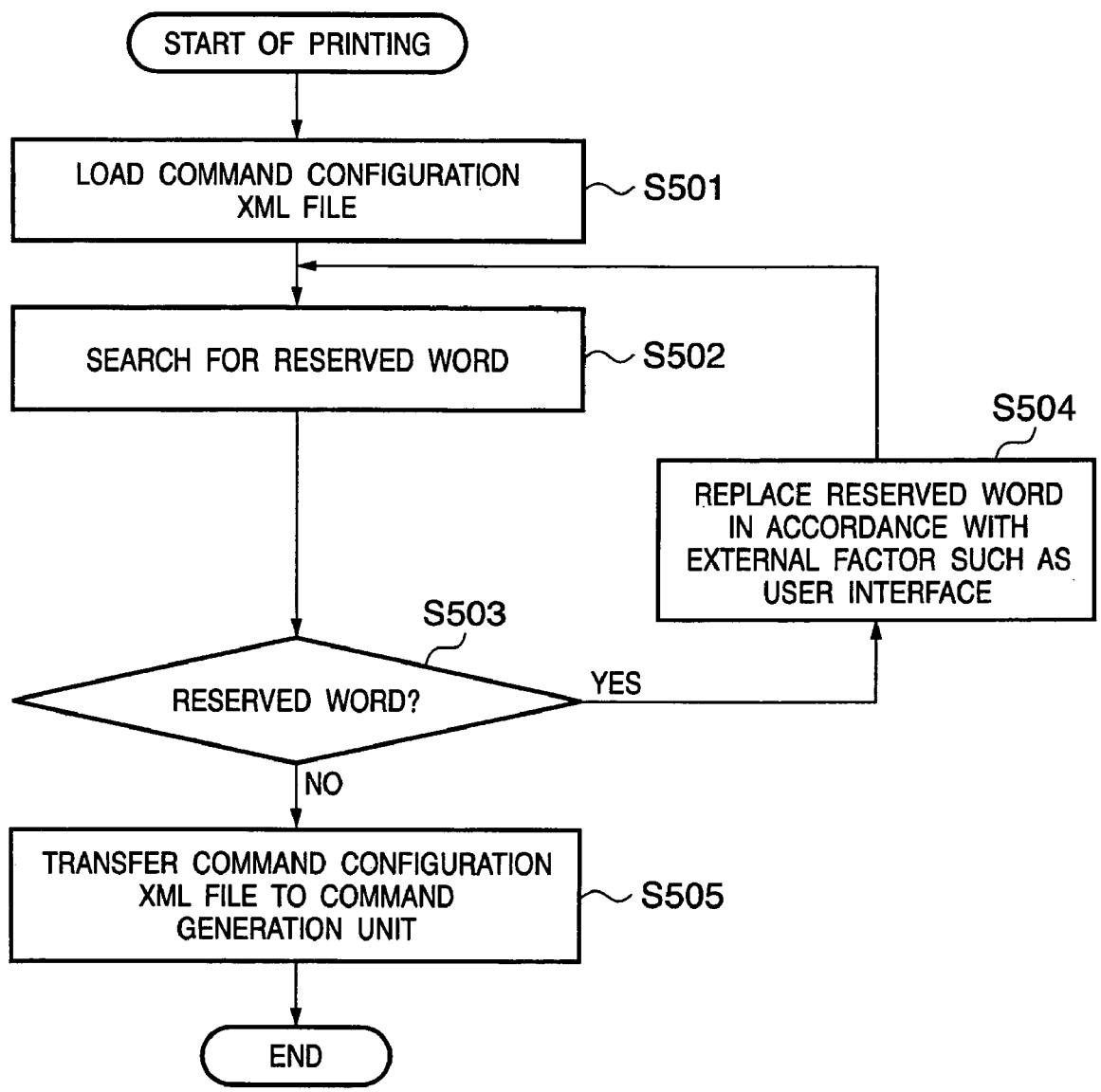
FIG. 5 is a flowchart showing processing applying the present invention.

FIGS. 4 and 5 are flowcharts showing processing applying the present invention. The operation of the apparatus will be described below with reference to FIG. 1 and these flowcharts as step-by-step processing procedures. First, the user interface 101 in FIG. 1 sets various kinds of print attributes and issues a print instruction. When the spooling system 102 receives the instruction as a print request, print processing starts.

The start of print processing corresponds to the start of printing in the flowchart in FIG. 4. When print processing starts, the spooling system 102 loads the XML analyzing unit 103 and, as needed, the command generation unit 105 in a memory and activates them in step S104. The XML analyzing unit 103 and command generation unit 105 can be either the same process or different processes. The command generation unit 105 may be present on the printer side.

The XML analyzing unit 103 receives, from the spooling system 102, print data and the print attribute set by the user interface 101. In step S402, the XML analyzing unit 103 loads the command configuration XML file 104. The XML analyzing unit 103 analyzes the command configuration XML file 104 and fills an unset command attribute value part described as a reserved word in the command configuration XML file 104 on the basis of an external factor such as print attribute information from the user interface 101 and transfers, to the command generation unit 105, the command configuration XML file complying with the configuration of a printer command.

In step S403, the command generation unit 105 generates a printer command on the basis of the command configuration XML file 104 received from the XML analyzing unit 103. Printer command generation processing is complete.

The processing of the XML analyzing unit 103 in step S402 described above will be described in more detail with reference to the flowchart in FIG. 5. In step S501, the XML analyzing unit 103 loads the command configuration XML file 104.

In step S502, the XML analyzing unit 103 analyzes the command configuration XML file 104 loaded in step S501 and searches for a part where a reserved word with a specific character string matches the description of the command configuration XML file 104, starting from the top of the command configuration XML file 104.

If a reserved word is found in step S503 by search in step S502, the processing advances to step S504 to replace the reserved word of unset command attribute value with an actual command attribute value by referring to the external factor such as the print attribute set by the user interface 101.

When reserved word replacement is complete in step S504, the processing returns to step S502 to search for a reserved word again. If no reserved word is found in step S503, the processing advances to step S505 to transfer, to the command generation unit 105, the command configuration XML file 104 that has completed replacement of all reserved words of command attribute values.

The above-described command configuration XML file 104 will be described with reference to a detailed example shown in FIG. 3. The command configuration XML file 104 describes the specification configuration of a printer command to control a printer.

A description 301 indicates a print start command containing an actual command ID and a command attribute value to be set there. The description 301 does not change due to an external factor. Hence, not a reserved word of unset command attribute value but an actual command attribute value is described.

A description 302 indicates a command to control a printing paper feed cassette. "InputSlot" of the description 302 is an attribute key name. The command attribute value to be given to this printer command is changed by print attribute information from the user interface 101. Hence, a reserved word "****" containing a specific character string is described as a command attribute value 303. A description 304 indicates a default attribute value to be used when no paper feed cassette information is obtained from the print attribute from the user interface 101. A description 305 represents a lookup table which contains pairs of attribute parameters and command attribute values and is used to refer to the print attribute from the user interface 101**. For example, a command attribute value corresponding to an attribute parameter "Cas3" is "100".

Figure 6:
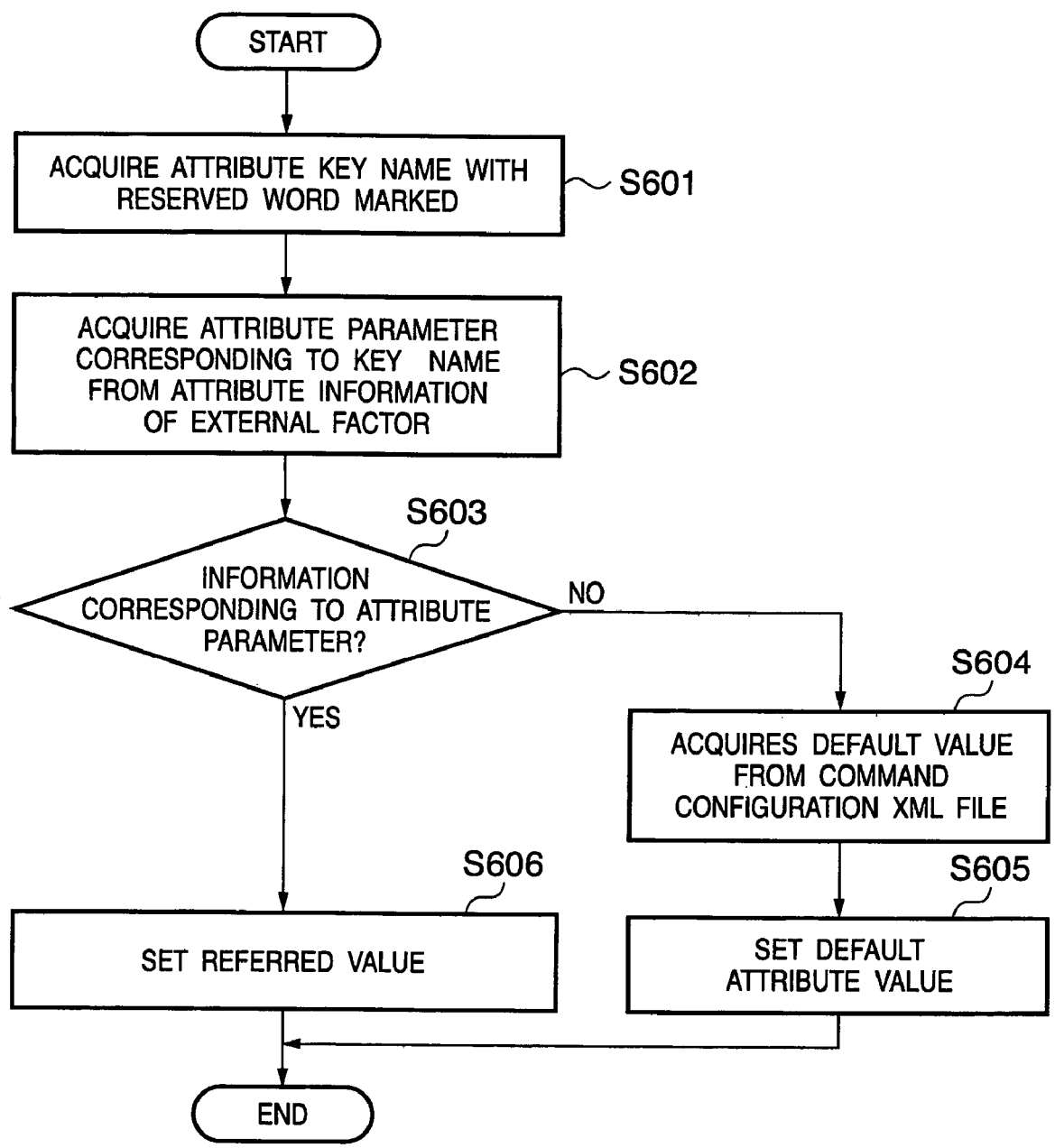
FIG. 6 is a flowchart showing reserved word replacement processing.
Figure 7:
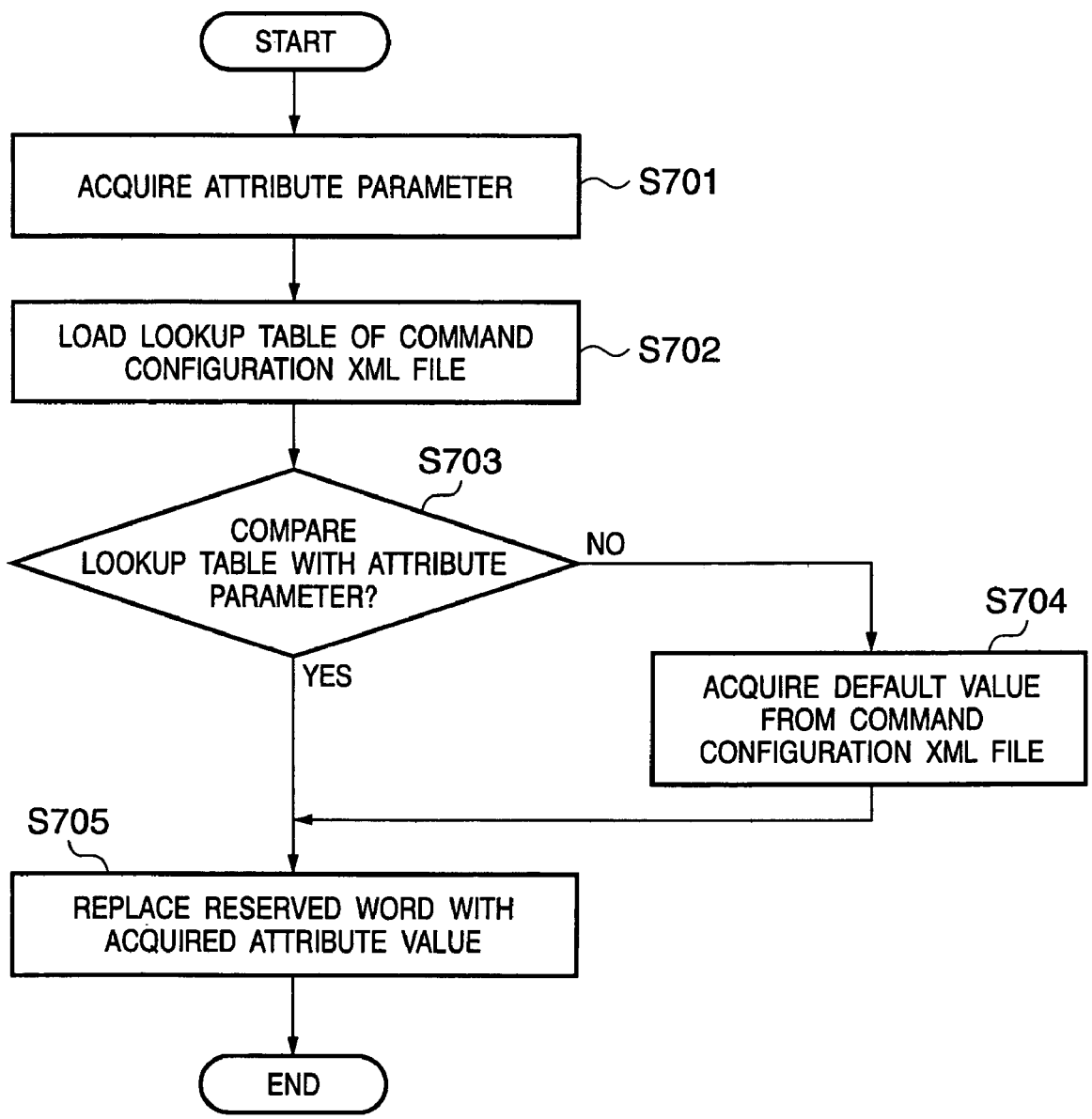
FIG. 7 is a flowchart showing processing of comparing a lookup table with an attribute.

The processing in step S504 described above will be described next in more detail with reference to the flowcharts in FIGS. 6 and 7. In step S601, an attribute key name with a mark of reserved word is acquired. In step S602, the CPU inquires of the attribute information of the user interface 101 about an attribute parameter corresponding to the attribute key name acquired in step S601.

If the attribute parameter inquired in step S602 is not present in step S603, the processing advances to step S604 to acquire a default command attribute value from the command configuration XML file 104. In step S605, the reserved word part is replaced with the default command attribute value read in step S604.

In the example of the command configuration XML file shown in FIG. 3, the default value is indicated by 303. If the parameter is present in step S603, the processing advances to step S606 to acquire a command attribute value on the basis of the attribute parameter and the lookup table in the command configuration XML file 104. The reserved word part in the command configuration XML file 104 is actually replaced with the command attribute value. The processing is complete.

The processing in step S606 will be described with reference to the flowchart in FIG. 7. In step S701, an attribute parameter corresponding to a held attribute key is acquired from the print attribute information of the user interface 101. In step S702, the lookup table of the attribute key in the command configuration XML file 104 is loaded. If an attribute parameter in the lookup table matches the attribute parameter from the user interface 101 in step S703, the value is acquired as a command attribute value.

If no value corresponding to the attribute parameter is present in the lookup table in step S703, the default attribute value in the command configuration XML file 104 is set to the reserved word part in step S705.

If the command attribute value is acquired in step S703, the reserved word part is replaced with the acquired command attribute value in step S705, and the processing is complete. Step S606 described above is thus complete. To reduce the data amount in replacing the reserved word in step S705, the lookup table in the command configuration XML file 104 may be deleted.

FIG. 9 shows a detailed example of the reserved word replacement processing in step S606 and, more particularly, paper feed cassette setting processing. Reference numeral 901 denotes a reserved word part of unset attribute value; and 911, an attribute parameter "Cas2" corresponding to the attribute key name "InputSlot" of the attribute information from the user interface 101. As a command attribute value 922 corresponding to an attribute key "InputSlot" 921, an attribute value "11" corresponding to the attribute parameter "Cas2" is acquired from the lookup table in the command configuration XML file. The reserved word part is replaced with this attribute value.

Figure 8:
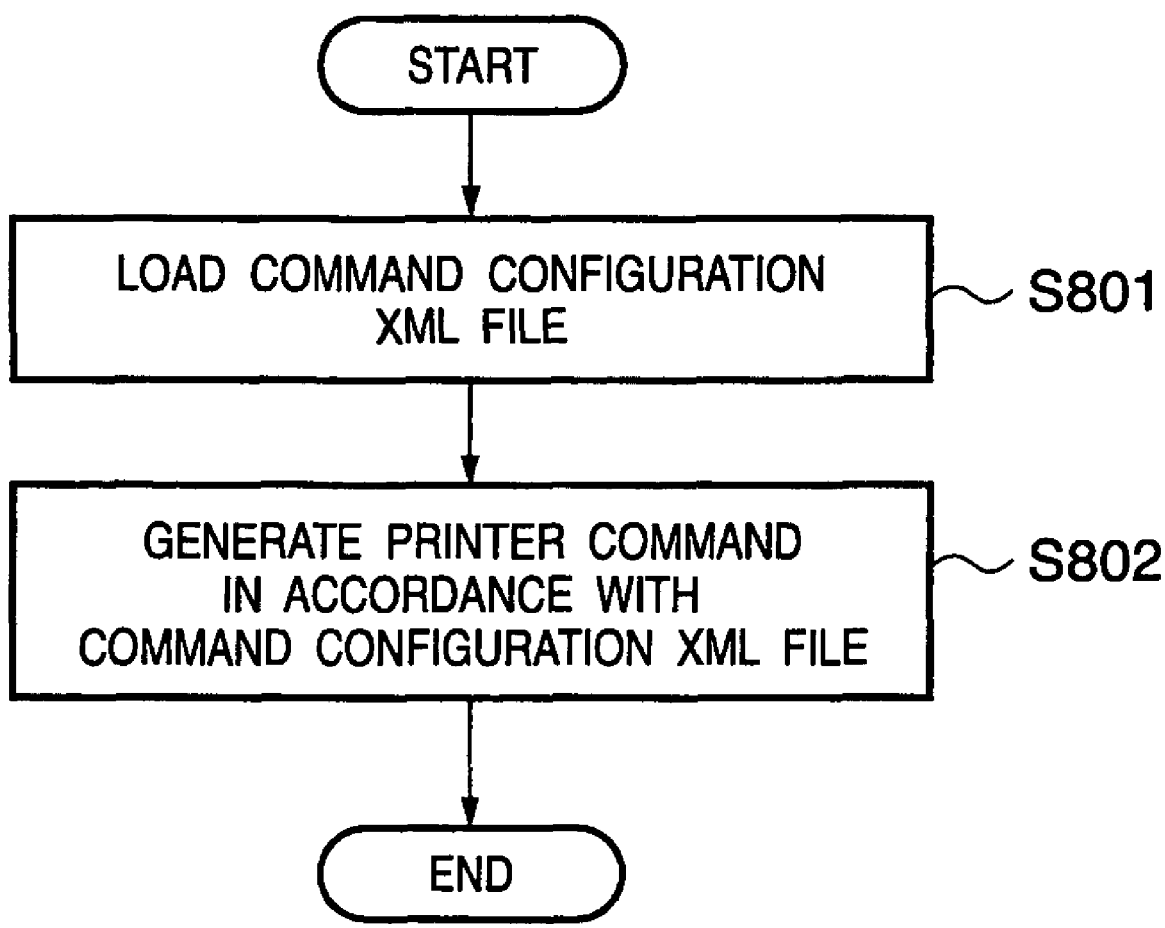
FIG. 8 is a flowchart showing processing of a command generation unit.

The processing of the command generation unit in step S403 will be described next with reference to the flowchart in FIG. 8. In step S801, the command generation unit loads the command configuration XML file 104 in which all reserved words are replaced by the XML analyzing unit 103.

The command configuration XML file 104 has a printer command specification format. Hence, the command generation unit can generate a printer command by simply creating an actual command packet in accordance with the command configuration XML file 104 in step S802. The command generation unit 105 may exist on the printer side.

The above-described processing allows to generate a printer command to control a printer by using the command configuration XML file 104 with configuration specifications of a printer command. It is possible to generate a printer command without activating different printer drivers corresponding to a plurality of printers.

It is possible to cope with a change in printer command specifications by newly providing the command configuration XML file 104 without changing the program.

The command configuration XML file 104 is described in the readable XML format. Hence, the user can easily customize it by, e.g., describing a part that changes depending on an external factor by using a reserved word or describing a reserved word part by an actual command attribute value in accordance with the printer utilization environment.

The object of the present invention can also be achieved by supplying a storage medium which records software program codes for implementing the functions of the above-described embodiment to a system or apparatus and causing the computer (or CPU or MPU) of the system or apparatus to read out and execute the program codes stored in the storage medium.

In this case, the program codes read out from the storage medium implement the functions of the above-described embodiment by themselves, and the program codes and the storage medium which stores them constitute the present invention.

Examples of the storage medium to supply the program codes are a flexible disk, hard disk, optical disk, magnetooptical disk, CD-ROM, CD-R, magnetic tape, nonvolatile memory card, and ROM.

The functions of the above-described embodiment are implemented not only when the computer executes the readout program codes but also when the OS (basic system or operating system) running on the computer wholly or partially executes actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit wholly or partially executes actual processing on the basis of the instructions of the program codes.

According to the present invention, printing can be done without installing a driver program for each printer. It is also possible to easily cope with a change in printer command specifications by providing a command configuration XML file.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-334813 filed on Nov. 18, 2005, which is hereby incorporated by reference herein in its entirety.

What is claimed is:

1. An information processing apparatus for generating a printer command to control a printer, based on print attribute information and print data, comprising:
   a computer-readable storage medium on which is stored a command configuration XML file in a human readable form;
   an input unit constructed to accept input from a user concerning print attribute information;
   a loading unit constructed to load the command configuration XML file which includes (a) a lookup table which has relationships between the print attribute information and a corresponding command attribute value, (b) a default command attribute value, and (c) a reserved word;
   a searching unit constructed to search a reserved word described in a specific character string in the loaded command configuration XML file;
   an obtaining unit constructed to obtain a command attribute value corresponding to the inputted print attribute information by referring to the lookup table in the loaded command configuration XML file;
   a replacing unit constructed to (1) replace the searched reserved word in the loaded command configuration XML file with the obtained command attribute value in a case where the inputted print attribute information exists in the lookup table, and (2) replace the searched reserved word in the loaded command configuration XML file with the default command attribute value in a case where the inputted print attribute information does not exist in the lookup table;
   an eliminating unit constructed to eliminate the lookup table in the loaded command configuration XML file processed by the replacing unit to generate a data-reduced command configuration XML file; and
   a command generation unit constructed to generate the printer control command on the basis of the data-reduced command configuration XML file processed by the eliminating unit.

2. The information processing apparatus according to claim 1, wherein the input unit accepts input from a user concerning the print attribute information along with input from the user concerning an attribute key name, and wherein the obtaining unit obtains the command attribute value corresponding to the inputted print attribute information and the inputted attribute key name.

3. The information processing apparatus according to claim 1, wherein the obtaining unit is further constructed to obtain the command attribute value based on the inputted print attribute information and printer utilization environment.

4. The information processing apparatus according to claim 1, wherein the inputted print attribute information specifies at least one of a paper feed cassette and an output paper bin.

5. An information processing method of generating a printer command to control a printer, based on print attribute information and print data, comprising the steps of:

accepting an input of print attribute information from a user;

loading a command configuration XML file in a human readable form including (a) a lookup table which has relationships between the print attribute information and a corresponding command attribute value, (b) a default command attribute value, and (c) a reserved word;

searching a reserved word described in a specific character string in the loaded command configuration XML file;

obtaining a command attribute value corresponding to the inputted print attribute information by referring to the lookup table in the loaded command configuration XML file;

in a case where the inputted print attribute information exists in the lookup table, processing the command configuration XML file by replacing the searched reserved word in the loaded command configuration XML file with the obtained command attribute value;

in a case where the inputted print attribute information does not exist in the lookup table, processing the command configuration XML file by replacing the searched reserved word in the loaded command configuration XML file with the default command attribute value;

eliminating the lookup table in the loaded and processed command configuration XML file to generate a data-reduced command configuration XML file; and using an information processing apparatus to generate the printer control command on the basis of the data-reduced command configuration XML file processed in the eliminating step.

6. A computer-readable storage medium retreivably storing a computer program which causes a computer to execute steps of an information processing method of claim 5.

* * * * *